United States Patent
Ando et al.

(10) Patent No.: US 7,401,979 B2
(45) Date of Patent: Jul. 22, 2008

(54) DYNAMIC PRESSURE BEARING DEVICE

(75) Inventors: Hironori Ando, Kyoto (JP); Kentaro Takemura, Kyoto (JP); Kazuto Mikami, Kyoto (JP)

(73) Assignee: Nidec Corporation, Kyoto (JP)

( * ) Notice: Subject to any disclaimer, the term of this patent is extended or adjusted under 35 U.S.C. 154(b) by 115 days.

(21) Appl. No.: 11/258,375

(22) Filed: Oct. 26, 2005

(65) Prior Publication Data
US 2006/0088233 A1    Apr. 27, 2006

(30) Foreign Application Priority Data
Oct. 27, 2004    (JP)    ............... 2004-313041
Oct. 26, 2005    (JP)    ............... 2005-312031

(51) Int. Cl.
*F16C 32/06*    (2006.01)
(52) U.S. Cl. .................... 384/107
(58) Field of Classification Search ............ 384/100, 384/107, 112, 121, 123
See application file for complete search history.

(56) References Cited

U.S. PATENT DOCUMENTS

| | | | | |
|---|---|---|---|---|
| 5,433,529 A | * | 7/1995 | Hensel | 384/112 |
| 5,988,886 A | * | 11/1999 | Takahashi | 384/107 |
| 6,126,320 A | * | 10/2000 | Ichiyama | 384/112 |
| 6,176,618 B1 | * | 1/2001 | Kawawada et al. | 384/107 |
| 6,361,216 B1 | * | 3/2002 | Takahashi et al. | 384/123 |
| 7,101,084 B2 | | 9/2006 | Gomyo | |
| 7,220,054 B2 | | 5/2007 | Gomyo | |

FOREIGN PATENT DOCUMENTS

| | | |
|---|---|---|
| CN | 1331509 A | 1/2002 |
| JP | 2002-34203 A | 1/2002 |
| JP | 2003-028147 | 1/2003 |
| JP | 2003-28147 A | 1/2003 |

OTHER PUBLICATIONS

Chinese Office Action dated Aug. 24, 2007 of CN 200510116868.9.

* cited by examiner

*Primary Examiner*—Thomas R Hannon
(74) *Attorney, Agent, or Firm*—Westerman, Hattori, Daniels & Adrian, LLP.

(57) ABSTRACT

In a wider flow path 4a surrounded with a shaft 3, a thrust plate 6 and an inner circumferential corner portion 1c of a bearing sleeve 1 in a small clearance 4 between a lower side radial bearing section 13 and an upper surface thrust bearing section 14, chamfering is performed at the inner circumferential corner portion 1c of the bearing sleeve 1, wherein a width of the wider flow path 4a in the radial direction in rotation is formed so as to be wider than a width of a communication hole 16 located below the wider flow path 4a in the radial direction in rotation to thereby render a flow of a lubricating fluid 5 flowing into the wider flow path 4a from the communication hole 16 smooth.

13 Claims, 13 Drawing Sheets

DYNAMIC PRESSURE BEARING DEVICE

FIELD OF THE INVENTION

The invention relates to a fluid dynamic pressure bearing device in which a bearing member and a shaft member are levitated so as to be relatively rotatable by a dynamic pressure generated in a lubricating fluid.

BACKGROUND OF THE INVENTION

In recent years, various proposals have been offered on a dynamic pressure bearing device for supporting various kinds of rotating bodies such as a magnetic disc, a polygon mirror and an optical disc which are rotated at a high speed. For example, in FIG. 13, there is shown a dynamic pressure bearing device mounted to a spindle motor for a hard disc driving device. Arrow marks in a solid line in FIG. 13 indicate directions along which pressures in a lubricating fluid in bearing portions work.

As shown in FIG. 13, a rotary shaft 110 is inserted in a bearing sleeve 100 in a freely rotatable manner. A lubricating fluid 120 such as oil is fed in a small clearance in a radial direction between an inner circumferential surface of the bearing sleeve 100 and an outer circumferential surface of a rotary shaft 110. Radial dynamic pressure bearing sections 130 and 131 at two sites spaced from each other are formed on the upper side and the lower side in the small clearance in the rotation axis.

A thrust plate 140 is joined to the rotary shaft 110. Both end surfaces of the thrust plate 140 in the rotation axis direction is arranged so as to face the bearing sleeve 100 and a counter plate 150 attached to the bearing sleeve 100 in the rotation axis direction with a small clearance interposed therebetween. The lubricating fluid 120 is fed in the small clearance so as to be in continuation from the radial bearing section 130.

Thrust dynamic pressure bearing sections 160 and 161 are formed on the top surface and bottom surface of the thrust plate 140 in the rotation axis direction. Besides, communication holes 170 are formed so as to cause the thrust dynamic pressure bearing sections 160 and 161 to communicate with each other. The lubricating fluid 120 is circulated to the radial dynamic pressure bearing sections 130 and 131 and to the thrust dynamic pressure bearing sections 160 and 161 through the communication holes 170.

The lubricating fluid 120, however, flows into a flow path 180 in the small clearance between the lower side radial bearing section 131 and the top surface thrust bearing section 160 from the communication holes 170 and collides with an inner circumferential corner portion 101 formed in the flow path 180 of the bearing sleeve 100. Hence, a flow of the lubricating fluid 120 is disturbed. Since no relief in space is available in the small clearance in the neighborhood of the inner circumferential corner portion 101 of the bearing sleeve 100, the intrinsic flow of the lubricating fluid 120 and a flow thereof created by collision thereof with the inner circumferential corner portion 101 of the bearing sleeve 100 are affected by each other. Therefore, a behavior of the lubricating liquid 120 is altered. As a result, vibrations are generated by causes of the collision of the lubricating fluid 120 with the bearing sleeve 100 and alteration in behavior thereof. This further creates a vibration problem of a spindle motor to which the dynamic pressure bearing device is mounted and a noise problem caused by the vibrations.

SUMMARY OF THE INVENTION

The invention can provide a dynamic pressure bearing device low in vibration and noise by reducing an influence of a behavior of a lubricating fluid due to collision of the lubricating fluid flowing in from communication holes with a bearing sleeve.

A dynamic pressure bearing device of the invention includes: a fixed section, a rotary section rotating relative to the fixed section about a rotation axis as a center; and a lubricating fluid held between the fixed section and the rotary section.

The rotary section includes: a shaft; and a thrust plate extending from the shaft outwardly in the radial direction. The fixed section includes: a sleeve having a step portion, and accommodating the shaft and the thrust plate with a radial clearance in radial direction between an outer side thereof and an inner side of the sleeve and an axial clearance in axial direction between an upper surface of the thrust plate and lower surface of the step portion; and a counter plate closing a lower end portion of the sleeve.

A fluid dynamic pressure bearing of the invention has a thrust dynamic pressure bearing section formed in at least one of the axial clearances provided on the upper surface and a lower surface of the thrust plate.

A communication hole penetrate the thrust plate in the axial direction is formed in the thrust plate at a vicinity of an outer surface of the shaft.

A wider flow path wider than the width of the axial clearance formed between is formed as a circulating flow path a vicinity of an upper end opening of the communication hole in axial direction. An area of a cross section to be obtained by cutting a wider flow path along a plane including the rotation axis is larger than an area of a cross section of the communication hole to be obtained by cutting the communication hole along a plane extending perpendicularly to the rotation axis.

An enlarged width of the wider flow path relative to the width of the axial clearance is larger than the cross sectional area of a communication hole to be obtained by cutting the communication hole along a plane perpendicular to the rotation axis.

The wider flow path may be formed so as to communicate with each upper end opening of the communication holes and the wider flow path may also be formed so as to be annular around the rotational axis.

The wider flow path is formed by chamfering the inner circumferential corner portion in a step portion of the sleeve. The radially outermost portion of the wider flow path in the radial direction is located at a radially outer location than a communication hole in the radial direction.

With the wider flow path formed, alteration in behavior of the lubricating agent can be suppressed that is caused by collision of the lubricating agent with the inner circumferential corner portion of the step portion of the sleeve. As a result, a flow of the lubricating agent is smoothened, thereby enabling vibrations of the dynamic pressure bearing device and a noise caused by the vibrations to be reduced.

DETAILED DESCRIPTION OF PREFERRED EMBODIMENTS

Figure 1:
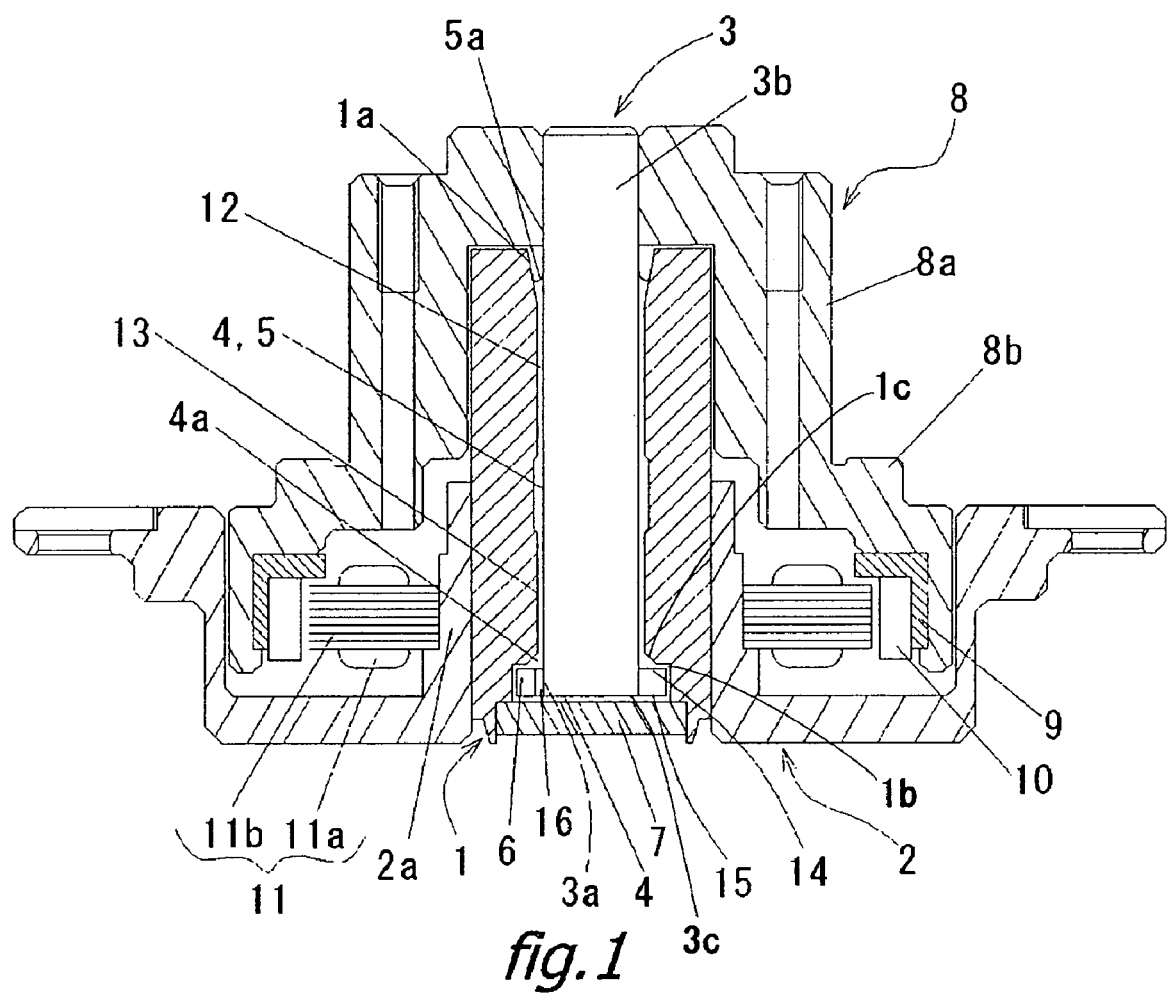
FIG. 1 is a view showing a section in the axis direction of a motor in an example related to the invention.

In FIG. 1, there is shown a hard disc driving spindle motor using a fluid dynamic pressure bearing device that is one construction of an example of fluid dynamic pressure bearing device related to the invention. FIG. 1 is a view of a section in the rotation axis direction.

With reference to FIG. 1, description will be given of the whole of a spindle motor for driving a hard disc.

A bearing sleeve 1 is in the shape of a hollow cylinder at the lower side of the outer circumferential surface of which a cylindrical case 2 with a bottom is fixed by, for example, engaging or adhesion, that is capable of coupling the spindle motor to a hard disc driving device directly with screws or the like. A shaft 3, which is a rotary shaft, is inserted into the bearing sleeve 1 with a small clearance 4 interposed therebetween on the inner circumferential surface of the bearing sleeve 1. Fed in the small clearance 4 is a lubricating fluid 5 such as oil or a magnetic fluid. A annular thrust plate 6 facing the bearing sleeve 1 with the small clearance 4 interposed therebetween is, for example, fixedly pressed fit on the outer circumferential surface 3a at the lower end of the shaft 3. A step portion 1b is formed in the lower side of the bearing sleeve 1 in order to accommodate the thrust plate 6. A counter plate 7 in the shape of a disc facing a lower surface of the thrust plate 6 with the small clearance 4 is, for example, fixedly press fit on the inner circumferential surface of the lower end of the bearing sleeve 1. The small clearance 4 assumes a single side sealing space structure with the counter plate 7 and the entire small clearance 4 is filled with the lubricating fluid 5. The small clearance 4 has a radial clearance 4b in radial direction between an outer side the thrust plate 6 and inner side of the bearing sleeve 1, and an axial clearance 4c in axial direction between an upper surface of the thrust plate 6 and a lower surface of the step portion 1b.

A rotary hub 8 almost in the shape of a cup on which a recording disc is rested (not shown) is, for example, fixedly press-fitting bonded at the top portion 3b of the shaft 3. In the rotary hub 8, not only does the rotary hub 8 have a cylinder section 8a on the outer circumferential portion of which a recording disc is placed, but there is also formed a placement section 8b extending from the cylinder section 8a in the radial direction in rotation to support the recording disc in the rotation axis direction. The recording disc is fixed by a pressing pressure of a damper (not shown).

A yoke 9 in the shape of a hollow cylinder formed with a magnetic substance is inner fit on the inner circumferential surface of the lower portion of the rotary hub 8. A rotor magnet 10 in the shape of a ring is inner fit on the inner circumferential surface of the yoke 9. A stator 11 is disposed on the outer circumferential surface of a cylinder section 2a of the case 2 so as to face the rotor magnet 10 with a clearance interposed therebetween in the radial direction in rotation. The stator 11 is formed by windings 11b around a stator core 11a, which is a laminate of electromagnetic steel sheets.

Figure 2:
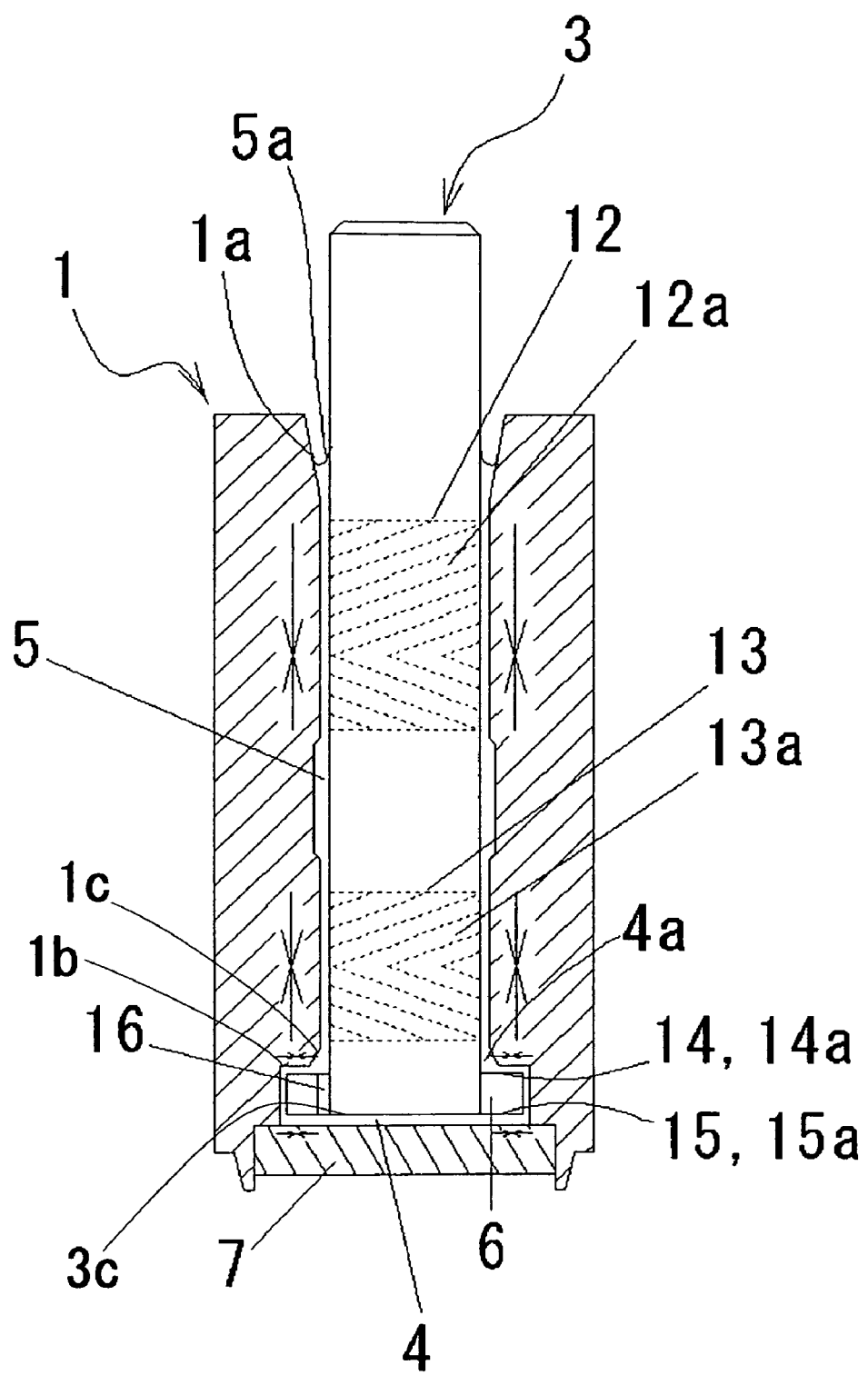
FIG. 2 is a view showing the neighborhood of a bearing section of the example related to the invention.

Then, description will be given of a bearing means constituted of the bearing sleeve 1 and the shaft 3 using FIG. 2. FIG. 2 is a view of the bearing and its neighbor thereof extracted from FIG. 1. Note that arrow marks in a solid line of FIG. 2 indicate pressure directions of the lubricating fluid 5 in bearing portions.

On the inner circumferential surface of the bearing sleeve 1, there are formed an upper side radial bearing section 12 and a lower side radial bearing section 13 that are bearing sections supporting the shaft 3 in the radial direction in rotation at two sites of an upper side and a lower side, respectively, thereof. In each of the bearing sections, there are annually formed an upper radial dynamic pressure generating grooves 12a and a lower side radial dynamic pressure generating groove 13a that are grooves in, for example, a herringbone pattern generating a dynamic pressure. A top surface thrust bearing section 14 and a bottom surface thrust bearing section 15 that are bearing sections supporting the shaft 3 in the rotation axis direction are formed at two sites between the upper surface of the thrust plate 6 in the rotation axis direction and the bottom surface of the step portion 1b of the bearing sleeve 1, and between the lower surface of the thrust plate 6 in the rotation axis direction and the upper surface of the counter plate 7. In the bearing sections, there are annually formed a upper surface thrust dynamic pressure generating grooves 14a and a lower surface thrust dynamic pressure generating groove 15a that are grooves, for example, in a herringbone pattern generating a dynamic pressure. The upper side radial bearing section 12 and the lower side radial bearing section 13 generate in rotation a dynamic pressure through pressurization of the rubricating fluid 5 by pumping actions of the upper radial dynamic pressure generating grooves 12a and the lower side redial dynamic pressure generating grooves 13a. With the actions of the dynamic pressures of the lubricating fluid 5, the rotary hub 8 together with the shaft 3 is supported in a freely rotatable manner in a state of no contact in the radial direction of rotation relative to the bearing sleeve 1. In a similar way, the upper surface thrust bearing section 14 and the lower surface thrust bearing section 15 generate in rotation dynamic pressures through pressurization of the lubricating fluid 5 by pumping actions of the upper surface thrust dynamic pressure generating grooves 14a and the lower surface thrust dynamic pressure generating grooves 13a. With the actions of the dynamic pressures of the lubricating fluid 5, the thrust plate 6 together with the shaft 3 is supported in a freely rotatable manner in a state of no contact in the rotation axis direction.

The top end portion 1a of the bearing sleeve 1 is open and the opening is tapered so that an inner diameter thereof is gradually smaller toward the lower side. Such a construction adopted can strengthen a surface tension of a gas liquid interface 5a, which is a seal structure of the lubricating fluid 5, formed at the top end portion 1a. Therefore, in any of cases where a motor rotates and where the motor stops its rotation, a position of the gas liquid interface 5a of the lubricating fluid 5 is fixed.

Figure 13:
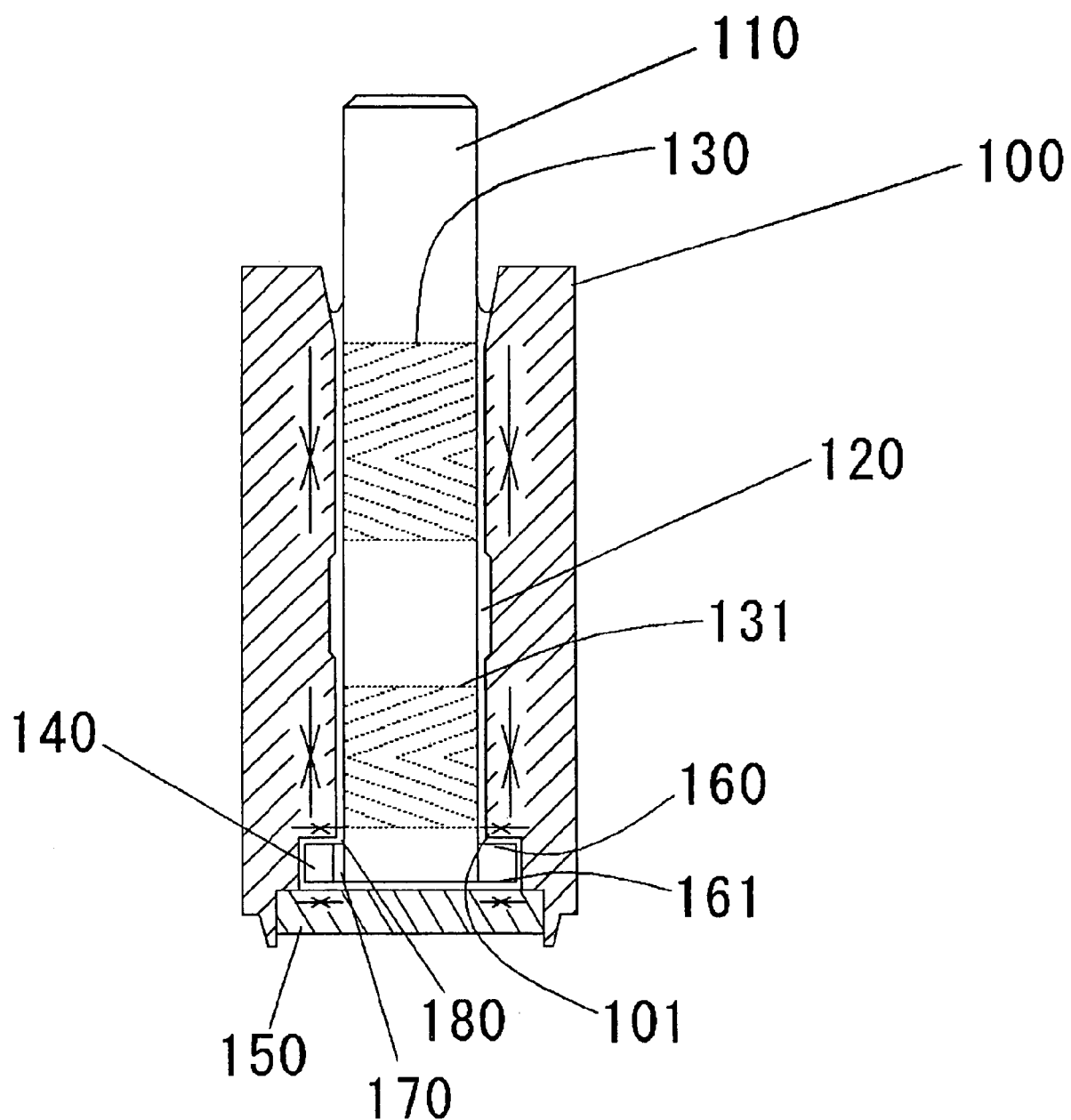
FIG. 13 is a view showing a section of a dynamic pressure bearing device in the axis direction thereof related to the conventional example.

Communication holes 16 are formed between the shaft 3 and the thrust plate 6. A flow path surrounded with the bearing sleeve 1, the shaft 3 and the thrust plate 6, which are disposed so as to face the top sides of the communication holes 16 in the small clearance 4 with the small clearance 4 interposed therebetween is wider as compared with the case of the conventional flow path 180 in FIG. 13: that is the flow path is formed as a wider flow paths 4a located between the lower side radial bearing section 13 and the upper surface thrust bearing section 14 in the small clearance 4 and the lubricating fluid 5 is pushed to the upper side by the lower side radial bearing section 13. The lubricating fluid 5 is moved by the top surface thrust bearing section 14 outwardly in the radial direction in rotation. As a result, in the wider flow path 14, a possibility arises that the lubricating fluid 5 is short, that is a possibility arises that an unbalance in pressure occurs. With the communication holes 16 adopted, however, if the lubricating fluid 5 is short, that is if a pressure in the wider flow path 4a is lowered, the lubricating fluid 5 in the axial clearance 4c is moved into the wider flow path 4a, where a pressure is lower, by a difference in pressure between the axial clearance 4c of the lower end surface 3c of the shaft 3 and the thrust plate 6, and the wider flow path 4a, thereby enabling a balance in pressure to be restored.

There are various ways of formation of communication holes 16. Description will be given of the ways of formation of communication holes using FIGS. 3 to 5.

Figure 3:
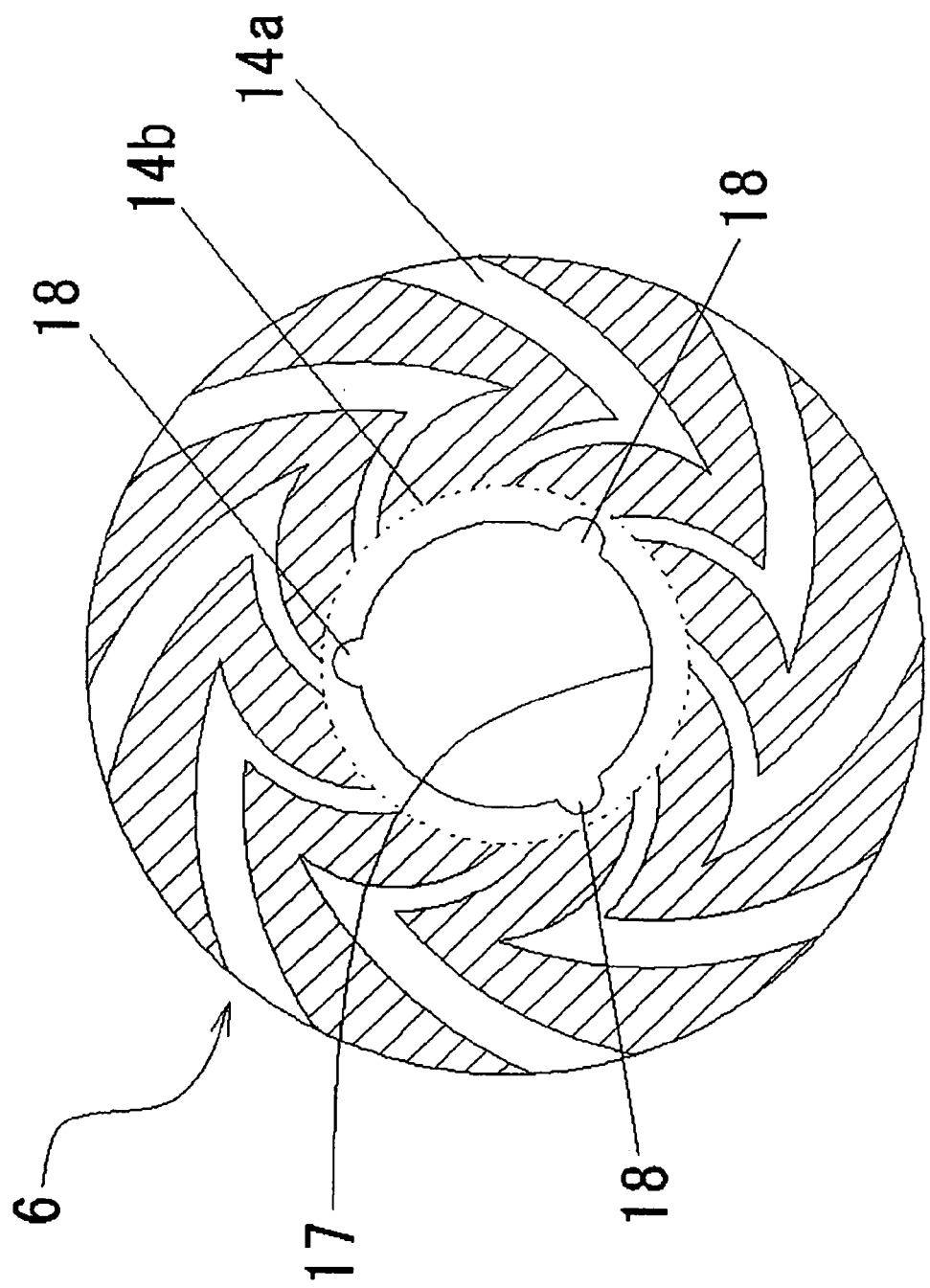
FIG. 3 is a view showing an example of thrust plate related to the invention.

FIG. 3 is a view showing a way in which recesses 18 are formed along inner circumferential portion 17 of the thrust plate 6 and the thrust plate 6 is engaged with the shaft 3 to thereby form communication holes 16.

The recesses 18 are formed on the inner side of an imaginary circle 14b assumed in the inner circumferential portion of the top surface axial dynamic pressure generating grooves 14a of the thrust plate 6. The inner circumferential portion except the recesses 18 are engaged with the shaft 3. As a result, portions enclosed by the recesses 18 and the outer circumferential surface of the shaft 3 are formed as the communication holes 16.

Figure 4:
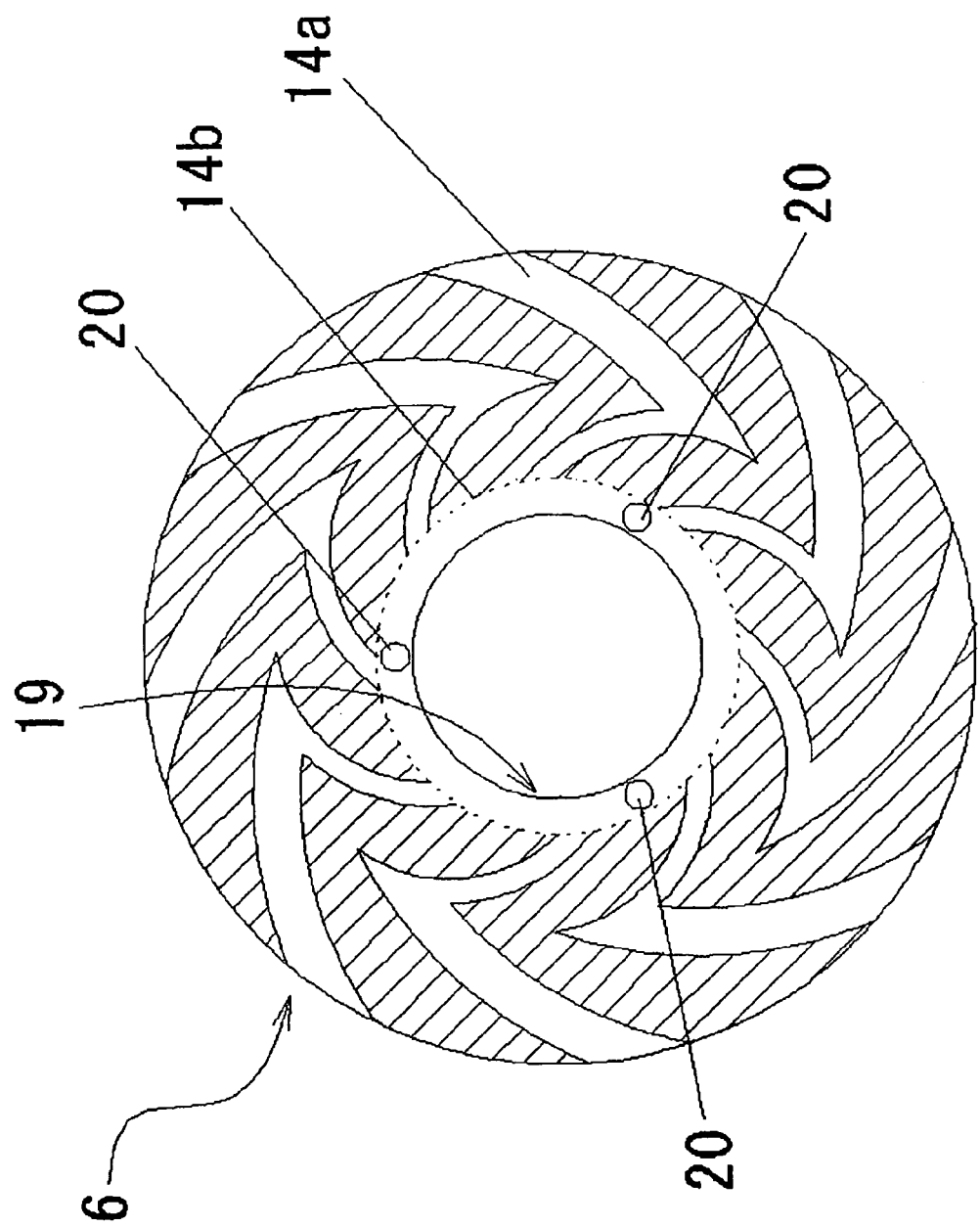
FIG. 4 is a view showing an example of thrust plate related to the invention.

FIG. 4 is a view showing the thrust plate 6 on the inner side portion 19 of which communication holes 20 are formed.

The communication holes 20 are formed so that the outer diameter of each communication hole 20 resides on the inner side of an imaginary circle 14b assumed on the inner circumferential portion of the top surface thrust dynamic pressure generating grooves 14a of the thrust plate 6.

Figure 5:
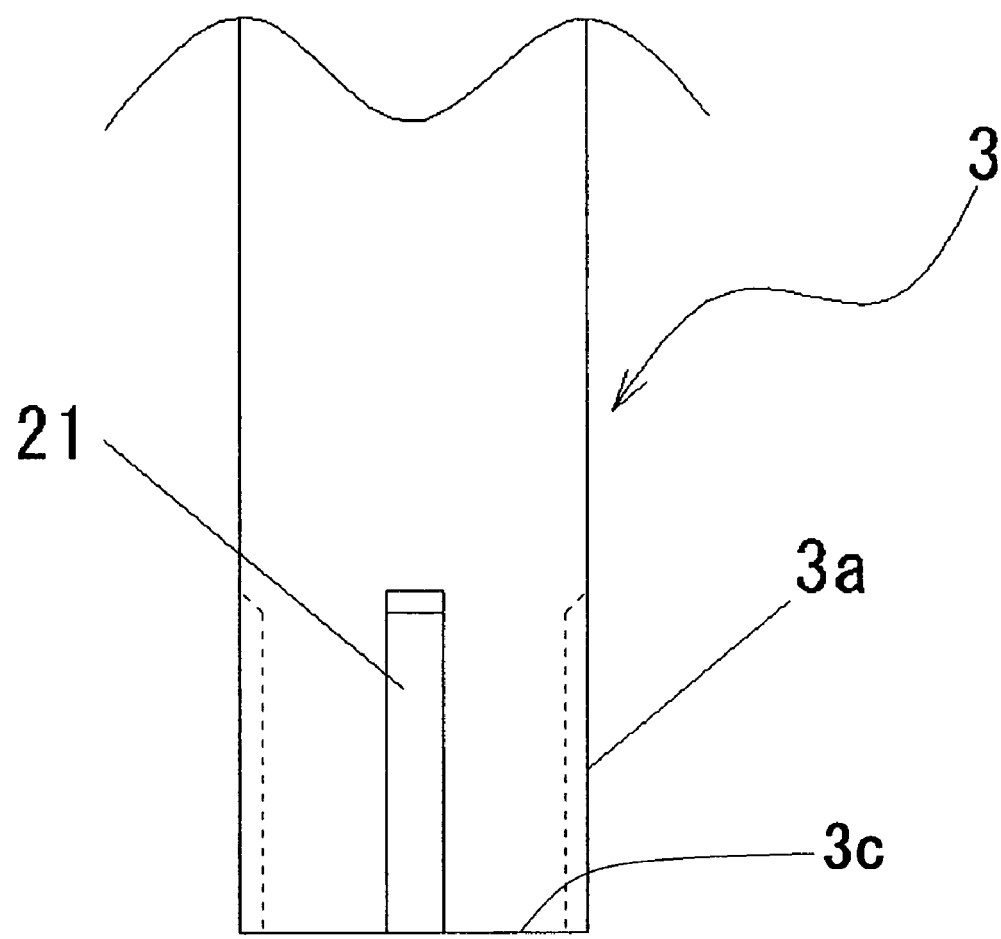
FIG. 5 is a view showing an example of thrust plate related to the invention.
Figure 5:
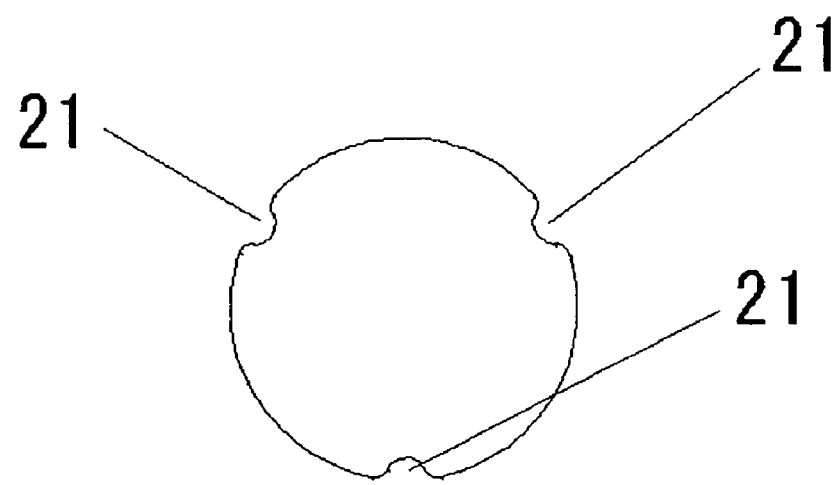

FIG. 5 is a view showing the shaft 3 on which recesses 21 in radial direction are formed in the rotation axis direction. FIG. 5 shows only the lower side portion of the shaft 3 and a lower part of FIG. 5 is a view as seen from the lower end face of the shaft.

A length of a recess 21, outwardly concave in the radial direction 21, in the rotation axis direction is at least more than a thickness of the thrust plate 6 in the rotation axis direction and less than the corresponding position of the lower side radial bearing section 13. By engaging with the thrust plate 6, the communication holes 16 are formed by the inner circumferential surface of the thrust plate 6 and the recesses 21 in the radial direction.

The communication holes of the invention are not limited to the way described above in the figures, and the numbers of recesses and communication holes in the thrust plate and the number of recesses in the radial direction of the shaft are not limited to those shown in the figures.

Figure 6:
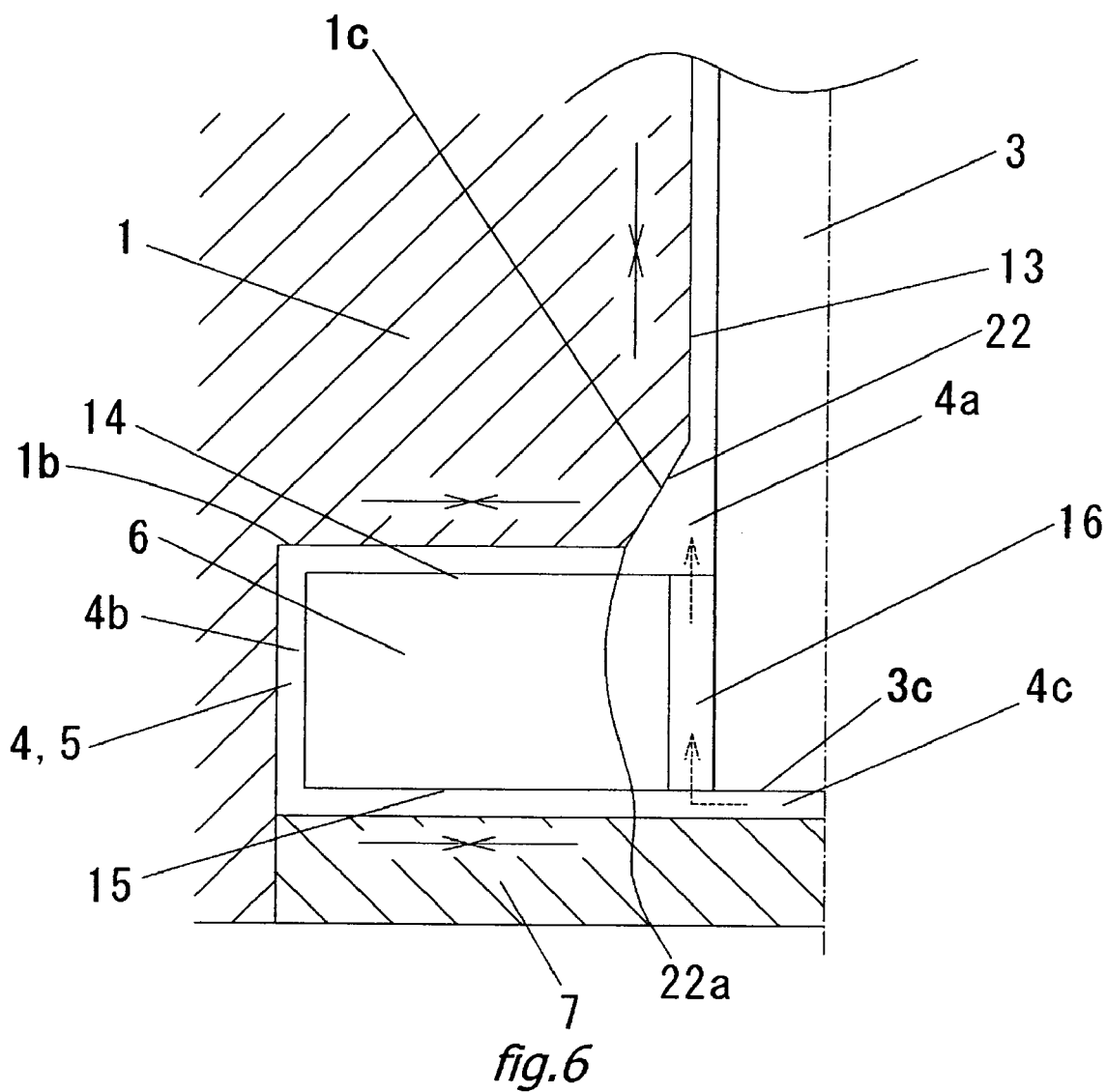
FIG. 6 is a view showing an example showing a relationship between a communication hole and a small clearance related to the invention.
Figure 7:
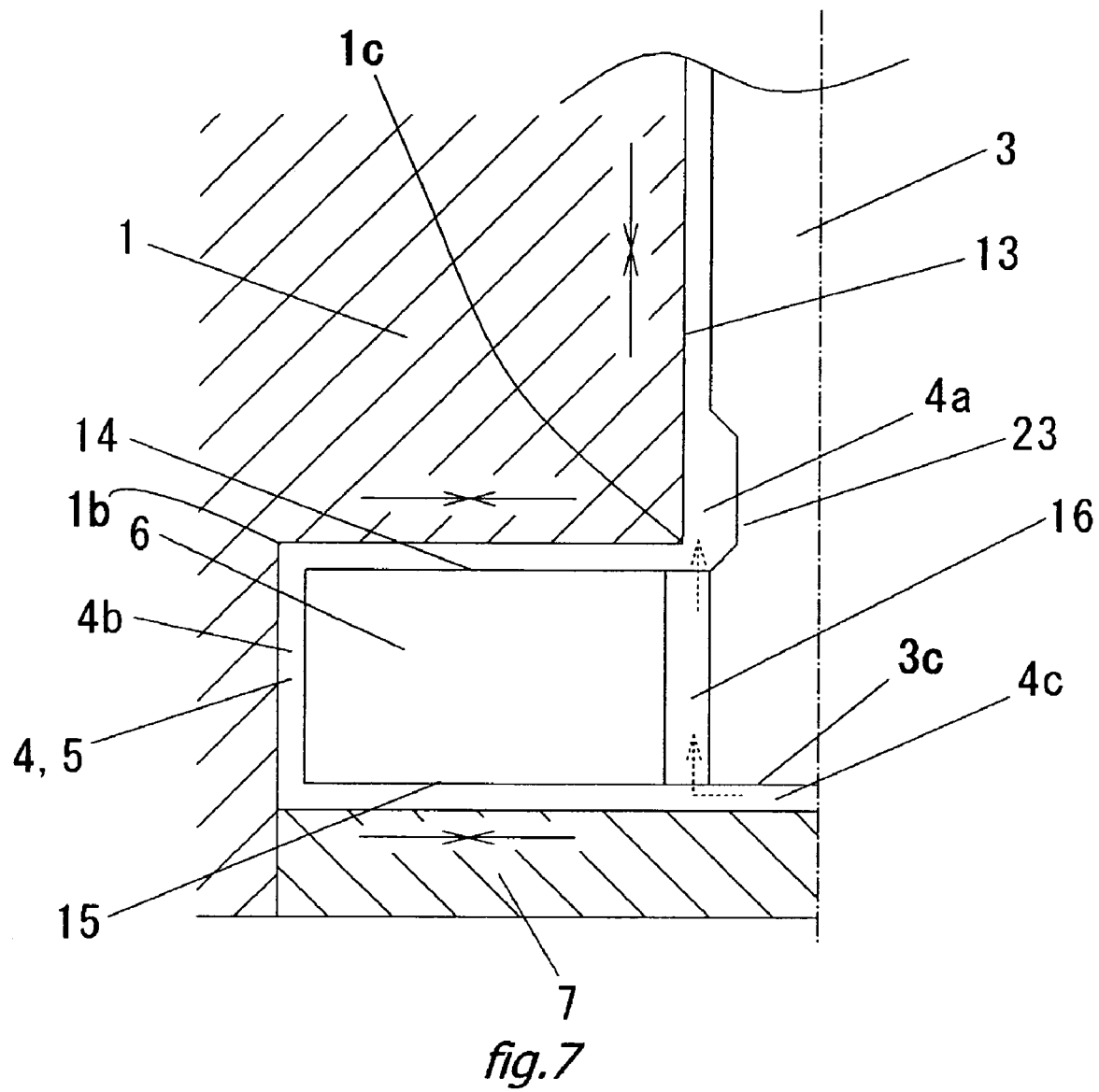
FIG. 7 is a view showing an example showing a relationship between a communication hole and a small clearance related to the invention.
Figure 8:
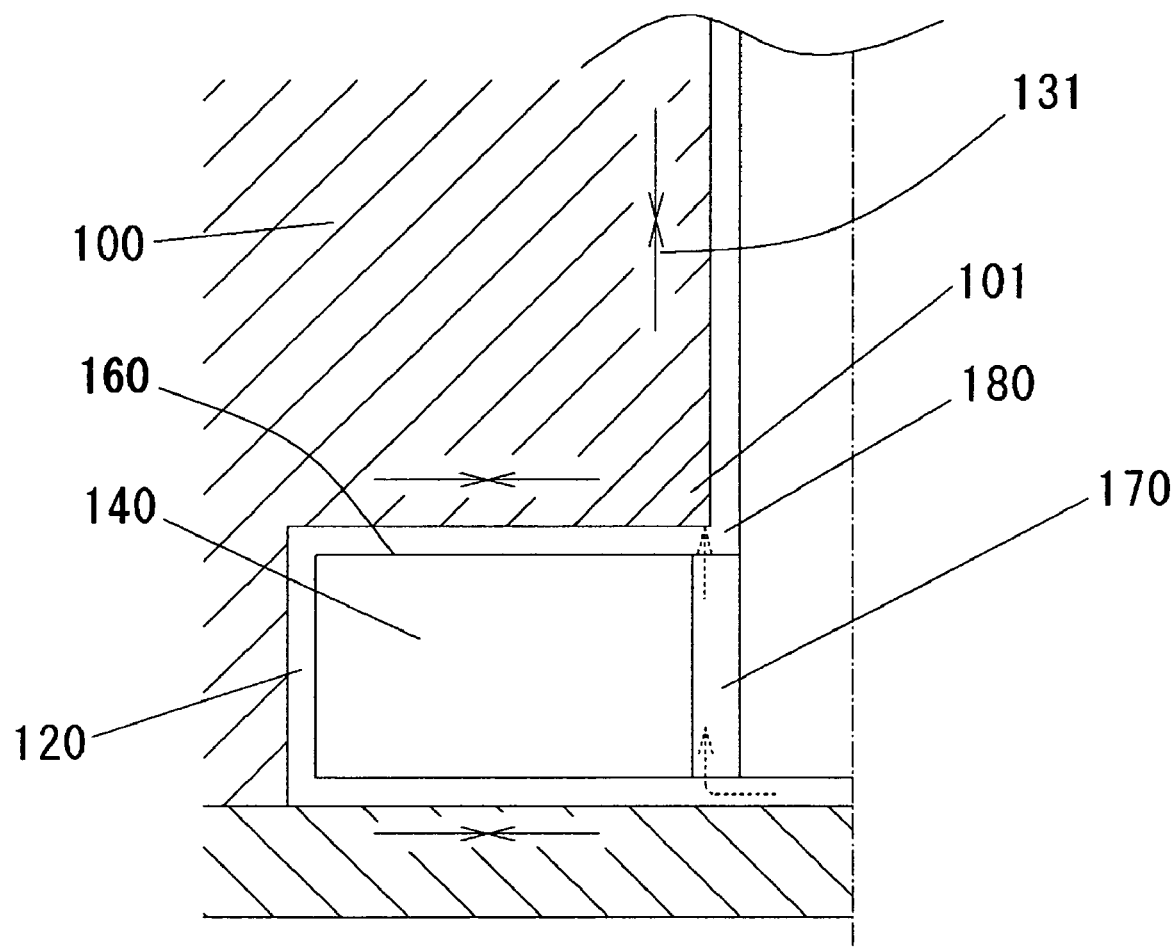
FIG. 8 is a view showing a relationship between a communication hole and a small clearance related to a conventional example.

Then, by using FIGS. 6 to 8, comparison of a conventional example with the examples will be individually conducted on wider flow path 4a enclosed by the bearing sleeve 1, the shaft 3 and the thrust plate 6 disposed facing the top portions of the communication holes in the small clearance 4 with the small clearance 4 interposed therebetween. Profiles in an alternate long and short dash line of FIGS. 6 and 7 show the rotary shafts. FIG. 8 is a view showing a flow path 180 between a lower side radial bearing section 131 and a top surface thrust bearing section 160 in a small clearance of the conventional example. Note that solid line arrow marks in the figures indicate pressure directions of a lubricating fluid in bearing portions. Dotted line arrow marks indicate flow directions of the lubricating fluid.

In the conventional example of FIG. 8, a width of a flow path 180 in an axial clearance is less than a width of each communication hole 170 in the radial direction in rotation. As a result, an inner circumferential corner portion 101 of a bearing sleeve 100 facing the thrust plate 140 in the rotation axis direction is located in part of the top side of each communication holes.

A lubricating fluid 120 passing through the communication holes 170 flows into the flow path 180 from the lower side to the upper side of the communication holes 170. Since an inner circumferential corner portion 101 is located where the lubricating fluid 120 flows into the flow path 180, the lubricating fluid 120 collides with the inner circumferential corner portion 101. Since the inner circumferential corner portion 101 is formed at a right angle relative to a flow of the lubricating fluid 120 that enters the flow path 180, the flow of the lubricating fluid 120 is disturbed by the inner circumferential corner portion 101. Since the flow path 180 is narrow and no relief in flow is available, plural different flows are generated in the flow path 180, which causes influences of each flow to exert on the other. As a result, a flow of the lubricating fluid 120 are largely changed to thereby cause the flow to be unsmooth. As a result, a behavior of the lubricating fluid 120 varies, resulting in an influence on vibrations of a motor.

FIG. 6 is a view showing a construction in which a chamfered portion 22 is formed at the inner circumferential corner portion 1c of an intersection of portions of the bearing sleeve 1 facing the shaft 3 and the thrust plate 6 with the small clearance 4 interposed therebetween to thereby form a wider flow path 4a. An end edge 22a of a chamfer is formed so that a width of the wider flow path 4a in the radial direction in rotation is more than a width of each communication hole 16 in the radial direction in rotation.

Since a width of the wider flow path 4a in the radial direction in rotation is more than the width of each communication hole 16 in the radial direction in rotation, a lubricating fluid 5 flows in each communication hole from the lower side to the upper side and no disturbance occurs on a flow of the lubricating fluid 5 flowing into the wider flow path 4a. Since a tapered portion is provided to the bearing sleeve 1 of the wider flow path 4a, collision of the lubricating fluid 5 to the bearing sleeve 1 is alleviated to form a flow by which the lubricating fluid 5 is easily fed to the lower side radial bearing section 13 and the top side thrust bearing section 14. As a result, a flow of the lubricating fluid 5 becomes smooth, no change occurs in behavior of the lubricating fluid 5; therefore, no influence is exerted on vibrations of a motor.

The wider flow path 4a has enlarged widths in the radial direction in rotation and the rotation axis direction, which is compared with a width of the small clearance 4, than a width of each communication hole 16 in the radial direction in rotation. Thereby, since a volume of the wider flow path 4a can be set to a value large enough for the lubricating fluid 5 flowing into the wider flow path 4*a* from the communication holes 16, the wider flow path 4*a* plays a role as a buffer. As a result, the energy of the lubricating fluid 5 flowing into the wider flow path 4*a* from the communication holes 16 is alleviated and in the state, collides with the bearing sleeve 1. Therefore, vibrations due to the lubricating fluid 5 can be reduced, thereby enabling a noise from the vibrations to be reduced.

FIG. 7 is a view showing a construction in which a recess 23 in the circumferential direction is formed on the upper side of the communication holes 16 of the shaft 3 to thereby a wider flow path 4*a* is formed in a small clearance 4. The recess 23 in the circumferential direction is formed on the lower side of the lower side radial bearing section 13. The circumferential recess 23 may communicate with the communication holes 16. The circumferential recess 23 may be formed either so as to cover the total circumference of the shaft 3, or so as to cover part of the total circumference thereof. A width of the wider flow path 4*a* in the radial direction in rotation is set to be larger than a width of each communication hole 16 in radial direction.

By forming the recess 23 in circumferential direction on the upper side of the communication holes 16 of the shaft 3, the lubricating fluid 5 can flow into the recess 23 in circumferential direction even if the lubricating fluid 5 collide with the inner circumferential corner portion 1*c* of the bearing sleeve 1. This is because since the recess 23 in circumferential direction is provided, a pressure becomes lower as compared with those in the other small clearances. Since the lubricating fluid 5 flows into the recess 23 in circumferential direction low in pressure, a flow from the communication holes 16 to the recess 23 in circumferential direction of the lubricating fluid 5 can be formed. Thereby, a flow of the lubricating fluid 5 in the wider flow path 4*a* becomes smooth, no change occurs in behavior of the lubricating fluid 5 and no adverse influence is given to vibrations of a motor.

Figure 9:
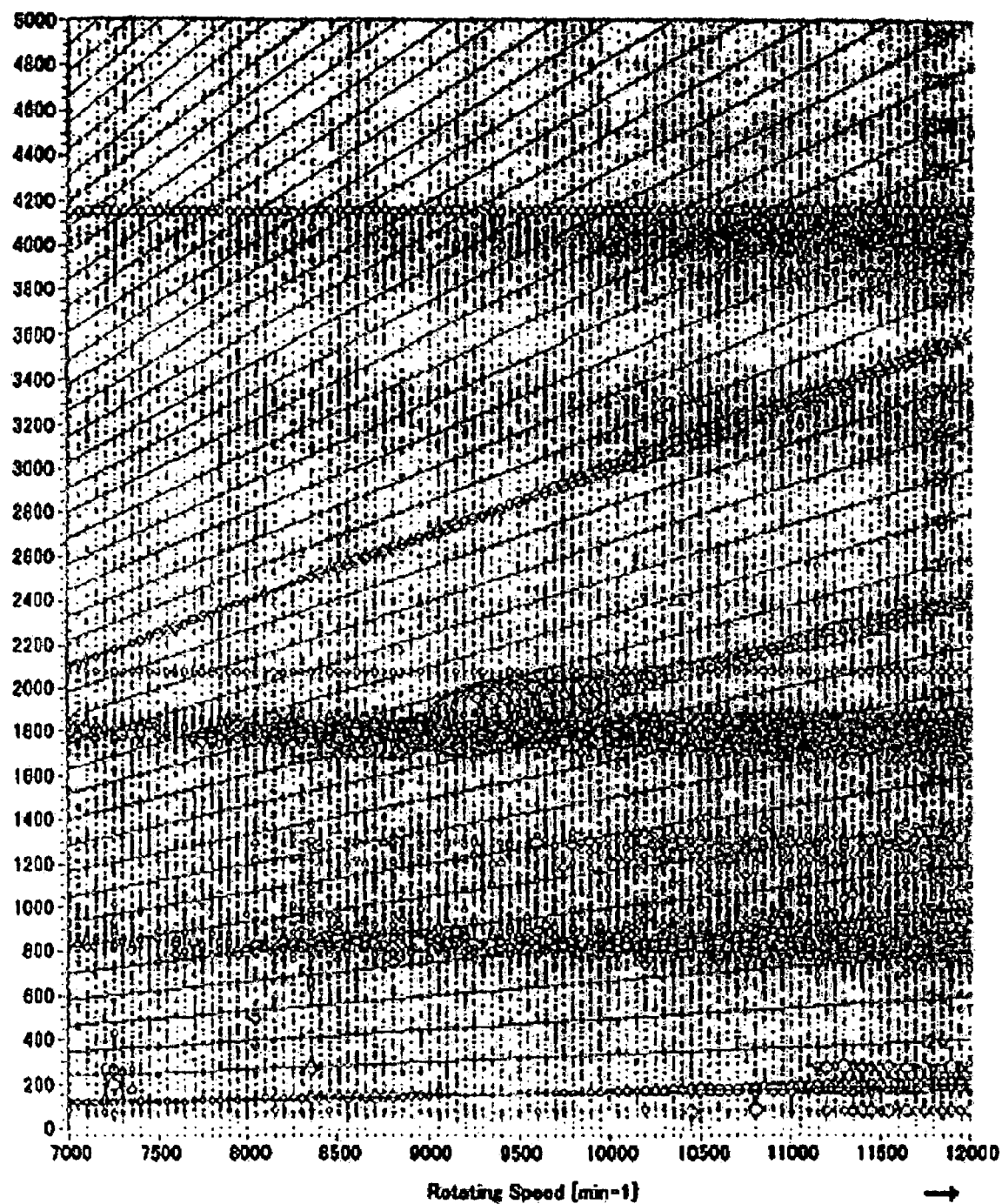
FIG. 9 is a chart showing results of Cambel measurement related to the conventional example.
Figure 10:
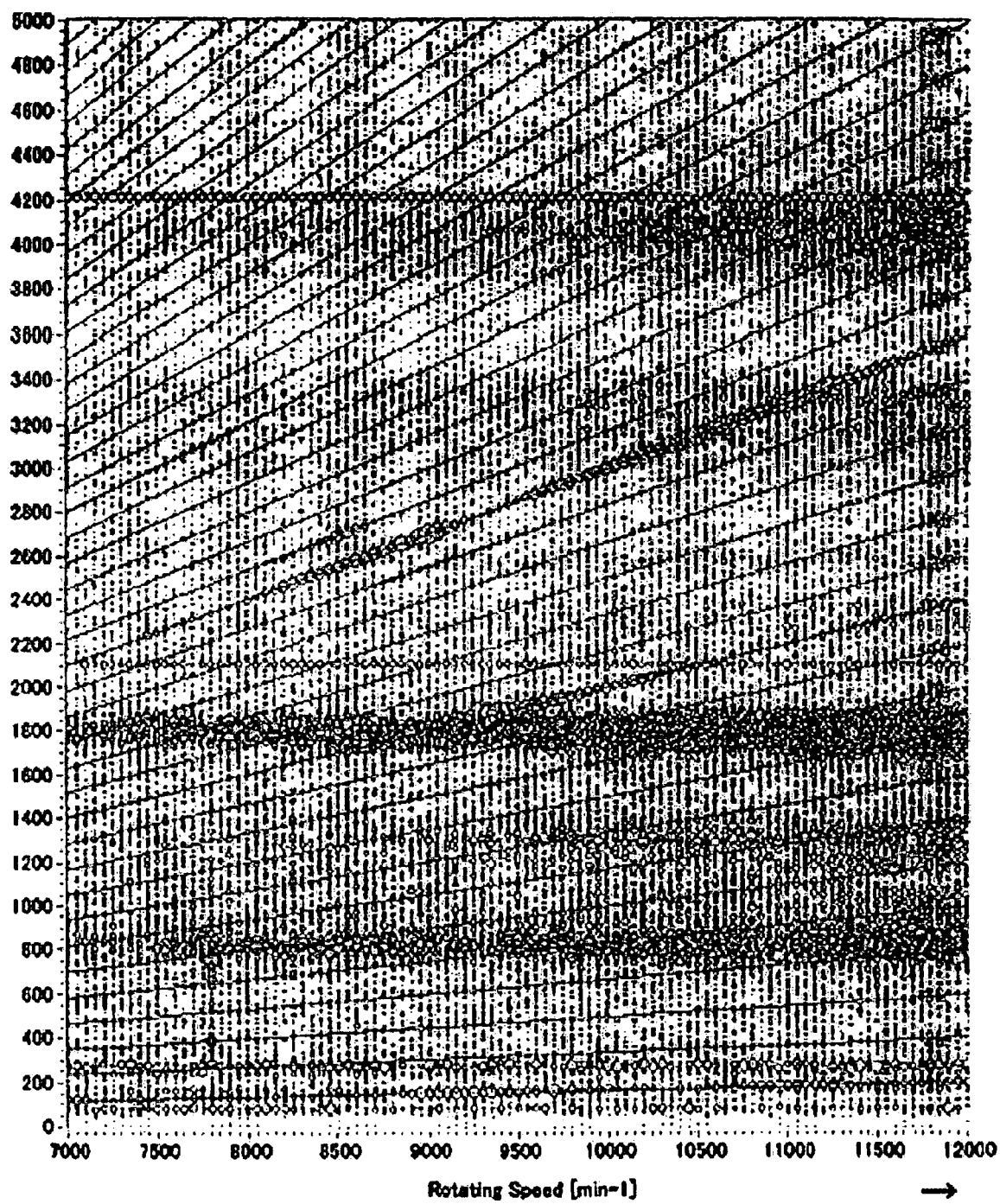
FIG. 10 is a chart showing results of Cambel measurement related to the invention.

FIG. 9 shows results of Cambel measurement in a case where a width of the wider flow path 4*a* in the radial direction in rotation is smaller than each of conventional communication holes 16 and FIG. 10 shows results of Cambel measurement in a case where a width of the wider flow path 4*a* in the radial direction in rotation is larger than each of the communication flow paths 16.

Description will be given here of an outline of a way of understanding the results of Cambel measurement.

To begin with, graphs shown in FIGS. 9 and 10 are referred to Cambel charts. The Cambel chart is a graph in which the abscissa is assigned to a rotating speed and the ordinate is used for plotting a frequency or a rotation degree and a magnitude of an amplitude is expressed by a size of a circle. These Cambel charts enable relationships of a frequency and an amplitude of vibrations vs. a change in rotation speed to be visually understood. Thereby, by seeing a Cambel chart, it can be grasped what rotation speed a motor increases vibrations at or which frequency vibrations increase at and further the amplitude of vibrations can be known from the chart. Since a frequency when a rotation speed varies can be grasped, a Cambel chart is useful for detection of a characteristic frequency at which a frequency is constant independently of a rotation speed.

With reference to FIG. 9, which is a Cambel chart for a conventional example, it is understood that a circle is larger in size, that is the amplitude of vibrations becomes larger, at a position on a curve (in a middle portion of the graph). However, with reference to FIG. 10, which is a Cambel chart in an example of the invention, no such a circle large in size, which is observed on the chart shown in FIG. 9, is seen in FIG. 10.

That is, it is understood that the amplitude of vibrations decreases. Therefore, it is evidenced by the Cambel chart shown in FIG. 9 that the lubricating fluid 5 flowing into the flow path 180 from the communication holes 170 collides with the inner circumferential corner portion 101 of the bearing sleeve 100 to thereby render the flow thereof unsmooth and the behavior of the lubricating fluid 120 causes vibrations in a motor. In the invention, however, it is evidenced that since the chamfer 22 is provided to the bearing sleeve 1 and the groove 23 in the circumferential direction is provided to the shaft 3, the lubricating fluid 5, which collides with the inner circumferential corner portion 1*c* of the bearing sleeve 1 in a conventional construction, has almost no possibility of colliding therewith, and since a wider flow path 4*a* large in width of the clearance is provided, that is since a relief in space for a flow is provided, the flow of the lubricating fluid 5 in the wider flow path 4*a* is rendered smooth, which behavior exerts no adverse influence on vibrations of a motor. As a result, it is understood that such measures taken in the invention are effective to suppress the amplitude of vibrations. That is, a spindle motor with low in vibration and noise can be realized by providing the wider flow path 4*a* large in width.

Figure 11:
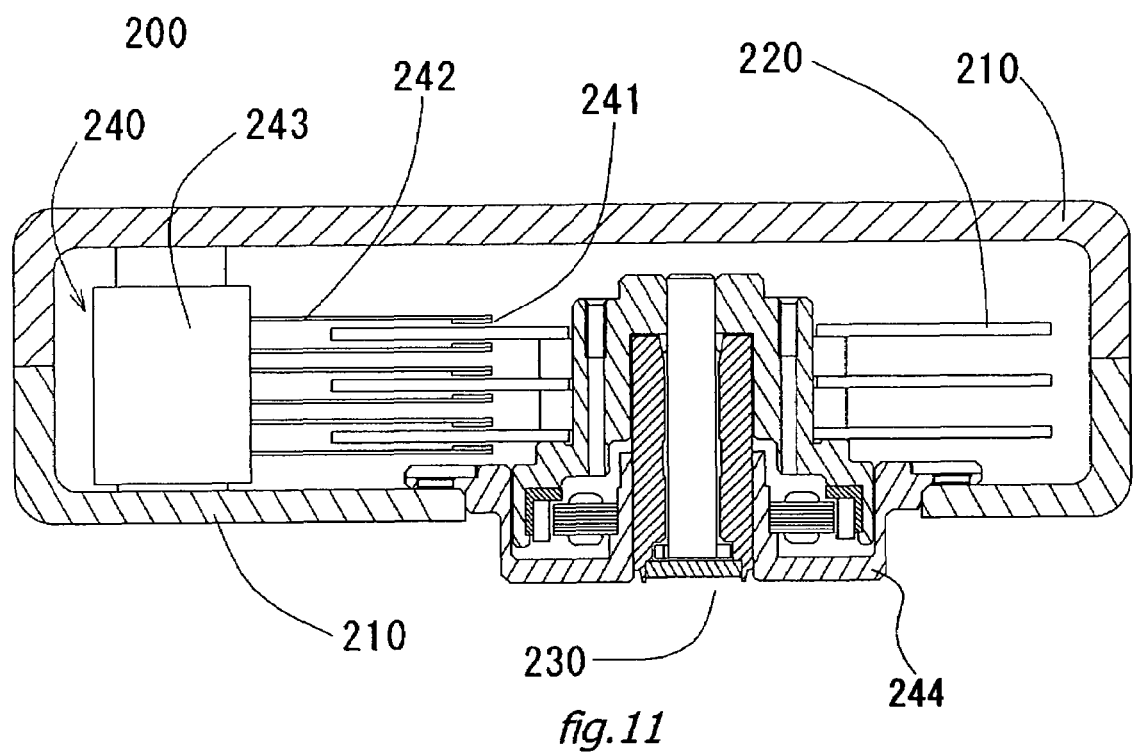
FIG. 11 is a view showing a section of a recording disc driving device in the axis direction thereof related to the invention.

Finally, description will be given of a recording disc driving device with a spindle motor of the invention using FIG. 11.

A recording disc driving device 200 is constituted of a housing 210 in the shape of a rectangle in section and a clean space extremely low in dust content is formed inside the housing 210 in which there is installed a spindle motor 230 with hard discs 220 which are recording discs each having a magnetic recording layer formed thereon. The housing 210 and a base 244 holding the sleeve described later may be molded in single piece.

Disposed inside the housing 210 is a head moving mechanism 240 having a function to read information from and write information to a magnetic recording layer on the hard discs 220 and the head moving mechanism 240 is constituted of: a magnetic head 241 reading information from and writing information to the hard discs 220; arms 242 supporting the magnetic head 241; and an actuator section 243 moving the magnetic head 241 and the arms 242 on the hard discs 220 to desired positions thereon.

A spindle motor 230 of the invention is applied as the spindle motor 230 of such a recording disc driving device 200, thereby enabling not only a small size and a low profile of the recording disc driving device 200 to be realized while a sufficient function is secured, but also a recording disc driving device high in reliability and durability to be provided.

While concrete description has been given, as described above, of embodiments of inventions related to the invention, the invention is not limited to the embodiments and variations or modifications can be implemented without departing from the sprit and scope of the invention.

For example, the thrust plate 6 in the above embodiment is made from a material different from that of the shaft 3, the invention can be applied to the thrust plate 6 and the shaft 3 integrated into a single piece. Dynamic pressure generating grooves may also be formed at symmetrical positions. That is, the dynamic pressure generating grooves 12*a* and 13*a* generating a radial dynamic pressure may be formed on the shaft 3. The dynamic pressure generating grooves 14*a* and 15*a* generating a thrust dynamic pressure may also be formed on the bearing sleeve 1 and the counter plate 7, respectively.

The invention is not limited to a dynamic pressure bearing device of a rotary shaft type as shown in the embodiments, and can also be applied to a dynamic pressure bearing device of a fixed shaft type in a similar way.

While the invention has the shaft 3 and the thrust plate 6 fixed together on the lower end outer circumferential surface 3a, the invention can be applied to a construction in which the shaft 3 and the thrust plate 6 are fixed relative to each other at any positions as far as the bearing sleeve 1 is disposed facing them with the small clearance interposed therebetween in the radial direction in rotation. The wider flow path 4a may also be formed with a recess formed in the neighborhood of openings of the communication holes 16 of the thrust plate 6.

Figure 12:
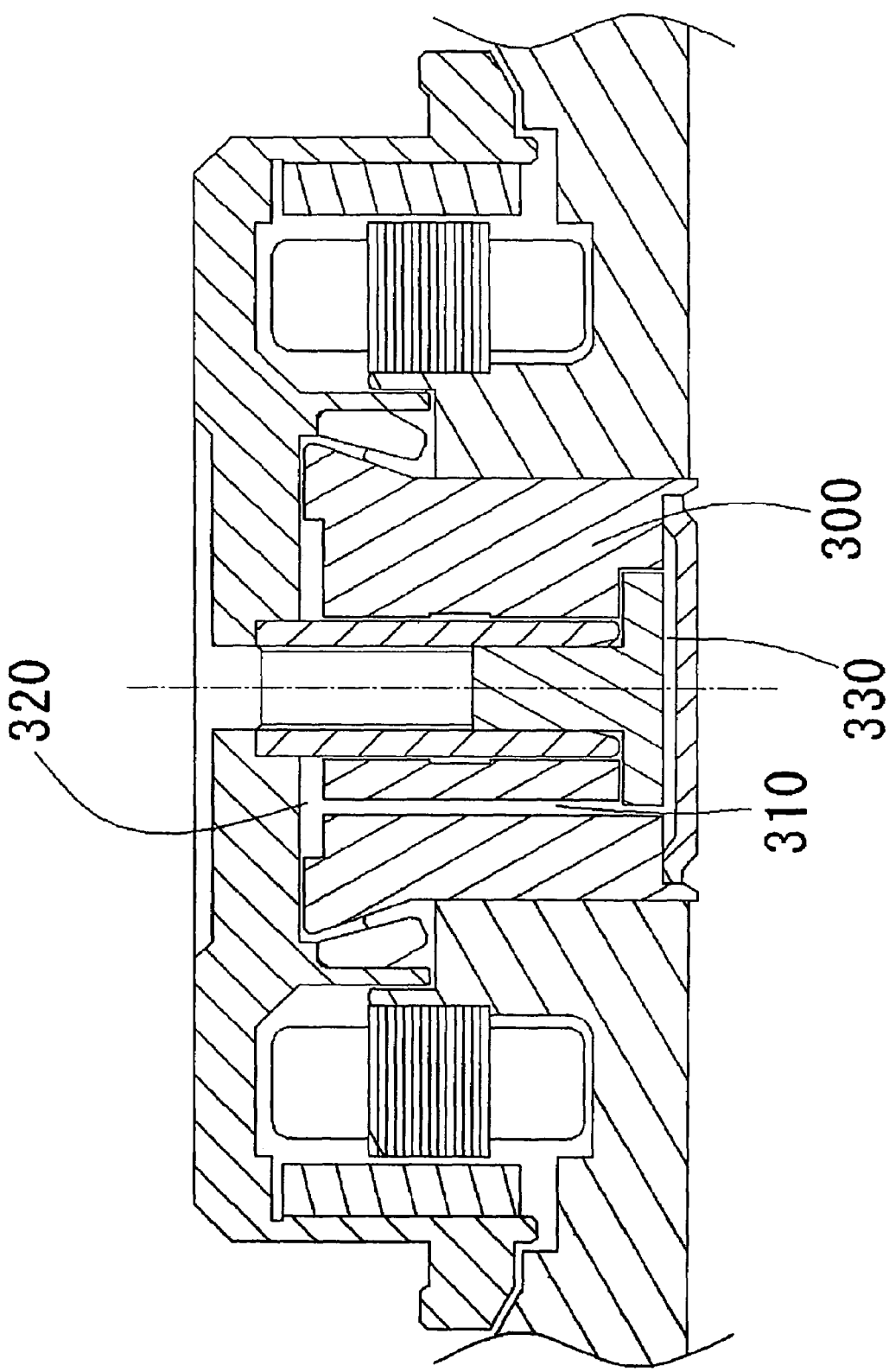
FIG. 12 is a view showing a section of a motor in the axis direction thereof in the example related to the invention.

While the communication holes 16 in the invention are formed in the thrust plate 6, the invention is not limited to this construction and the communication holes may be, as shown in FIG. 12, formed in the bearing sleeve 300. In this case, a wider flow path 320 is formed in the neighborhood of openings of communication holes 310 formed in the bearing sleeve 300. Of an area of a section of the wider flow path 320, the smallest area of a section in the radial direction in rotation thereof is formed wider than that formed by cutting along a plane including the radial direction in rotation of each communication hole 310. With such a construction adopted, disturbance in a flow of a lubricating fluid 330 from the communication holes 310 can be alleviated by the wider flow path 320.

The invention can be similarly applied to dynamic pressure bearing devices used in various devices such as a polygon mirror driving motor and a CD-ROM driving motor in addition to a spindle motor for driving a hard disc as described in the above embodiments.

What is claimed is:

1. A fluid dynamic pressure bearing comprising:
a fixed section;
a rotary section rotating relative to the fixed section about a rotation axis; and
a lubricating fluid held between the fixed section and the rotary section, wherein
the rotary section includes a shaft and a thrust plate which extends radially outward from the shaft,
the fixed section includes: a sleeve having a step portion and arranged to enclose the shaft and the thrust plate therein with a radial clearance and an axial clearance therebetween; and a counter plate closing a lower end portion of the sleeve,
the thrust plate has at least one communication hole formed therein in a vicinity of an outer surface of the shaft, the communication hole penetrating the thrust plate,
a radial distance between the shaft and an inner surface of a portion of the sleeve adjacent to the step portion becomes wider as the sleeve and the shaft move toward the thrust plate to form a wider flow path between the portion of the sleeve and the shaft, and
a radially outermost portion of the portion of the sleeve defining the wider flow path with the shaft is located radially outside the communication hole.

2. A motor having a fluid dynamic pressure bearing according to claim 1, wherein the fixed section further includes: an armature; and a base holding the armature and the sleeve, and
the rotary section further includes a rotary hub rotating together with the shaft in a single piece, a driving magnet fixed to the rotary hub and disposed opposite the armature.

3. A fluid dynamic pressure bearing comprising:
a fixed section;
a rotary section rotating relative to the fixed section about a rotation axis, and including a shaft and a thrust plate extending radially outward from the shaft; and
a lubricating fluid held between the fixed section and the rotary section, wherein
the fixed section includes:
a sleeve having a step portion and arranged to enclose the shaft and the thrust plate therein with a radial clearance and an axial clearance therebetween; and
a counter plate closing a lower end portion of the sleeve,
the thrust plate has at least one communication hole formed therein in a vicinity of an outer surface of the shaft, the communication hole penetrating the thrust plate,
a radial distance between the shaft and an inner surface of a portion of the sleeve adjacent to and above the step portion becomes wider as the sleeve moves toward the thrust plate to define a wider flow path by the portion of the sleeve and the shaft, and
a radially outermost portion of the portion of the sleeve defining the wider flow path is located radially outside a radially outermost portion of an upper opening end of the communication hole while a radially innermost portion of the portion of the sleeve is located radially inside the radially outermost portion of the upper opening end of the communication hole, and
the portion of the sleeve defining the wider flow path connects an upper surface of the step portion and an inner surface of a remaining portion of the sleeve to each other.

4. A fluid dynamic pressure bearing comprising:
a shaft rotatable about a rotation axis;
a thrust plate radially extending from an outer peripheral surface of the shaft and having at least one communication hole formed therein, the communication hole axially penetrating the thrust plate;
a fixed section having a hole into which the shaft is inserted, and having an inner peripheral surface opposed to the outer peripheral surface of the shaft, a lower surface axially opposed to an upper surface of the thrust plate, and an opposing surface opposed to a lower surface of the thrust plate; and
a lubricating fluid continuously arranged between the outer peripheral surface of the shaft and the inner peripheral surface of the fixed portion, between the upper surface of the thrust plate and the lower surface of the fixed surface, between the lower surface of the thrust plate and the opposing surface of the fixed section, and in the communication hole, wherein
the fixed section includes a connecting portion which connects the inner peripheral surface and the lower surface thereof to each other, and
a radially outermost portion of an opening of the communication hole in the upper surface of the thrust plate is located radially between an axially uppermost portion and an axially lowermost portion of the connecting portion.

5. The fluid dynamic pressure bearing according to claim 4, wherein the connecting portion is a chamfered portion.

6. The fluid dynamic pressure bearing according to claim 4, wherein a wider flow path is defined by the connecting portion, the outer peripheral portion of the shaft, and the upper surface of the thrust plate, the lubricating fluid being stored in the wider flow path.

7. The fluid dynamic pressure bearing according to claim 6, wherein while the shaft is rotating, the lubricating fluid arranged in the communication hole flows axially downward into the wider flow path.

8. The fluid dynamic pressure bearing according to claim 6, wherein a plurality of communication holes are formed in the thrust plate, and the wider flow path is in communication with the communication holes.

9. The fluid dynamic pressure bearing according to claim 6, wherein the wider flow path is annular about the center axis.

10. The fluid dynamic pressure bearing according to claim 4, wherein a radial distance between the outer peripheral surface of the shaft and the inner peripheral surface of the fixed section is smaller than a radial width of the communication hole, and a radial bearing section which generates a hydrodynamic pressure while the shaft is rotating is defined by the outer peripheral surface of the shaft and the inner peripheral surface of the fixed section.

11. The fluid dynamic bearing according to claim 10, wherein a top surface thrust bearing section which generates a hydrodynamic pressure while the shaft is rotating is defined by the upper surface of the thrust plate and the lower surface of the fixed section, and a bottom surface thrust bearing section which generates a hydrodynamic pressure while the shaft is rotating is defined by the lower surface of the thrust plate (6) and the opposing surface of the fixed section.

12. A motor comprising the fluid dynamic pressure bearing according to claim 4, wherein a rotary section rotatable to the fixed section includes the shaft, the thrust plate, and a rotor magnet, and the fixed section is provided with a stator opposite to the rotor magnet.

13. A disk drive comprising the motor according to claim 12.

* * * * *